United States Patent
Chen et al.

(10) Patent No.: US 11,943,053 B2
(45) Date of Patent: Mar. 26, 2024

(54) CODE BLOCK HEADER FOR FAST RLC PDU DELIVERIES IN 5G NR

(71) Applicants: Xixian Chen, Ottawa (CA); Qingchao Liu, Ottawa (CA); Yashar Nezami, Ottawa (CA)

(72) Inventors: Xixian Chen, Ottawa (CA); Qingchao Liu, Ottawa (CA); Yashar Nezami, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 263 days.

(21) Appl. No.: 17/422,785

(22) PCT Filed: Feb. 19, 2019

(86) PCT No.: PCT/IB2019/051336
§ 371 (c)(1),
(2) Date: Jul. 14, 2021

(87) PCT Pub. No.: WO2020/170008
PCT Pub. Date: Aug. 27, 2020

(65) Prior Publication Data
US 2022/0094477 A1   Mar. 24, 2022

(51) Int. Cl.
*H04L 1/00* (2006.01)
*H04L 69/22* (2022.01)

(52) U.S. Cl.
CPC .......... *H04L 1/0083* (2013.01); *H04L 1/0084* (2013.01); *H04L 69/22* (2013.01)

(58) Field of Classification Search
CPC ..... H04L 1/0083; H04L 1/0084; H04L 69/22; G06F 3/0679; G11C 29/08
See application file for complete search history.

(56) References Cited

U.S. PATENT DOCUMENTS

| 9,992,004 B2 | 6/2018 | Mallik et al. |
| 2005/0053035 A1* | 3/2005 | Kwak .............. H04W 72/1268 370/320 |

(Continued)

OTHER PUBLICATIONS

ISR and WO for PCT/IB2019/051336.
(Continued)

*Primary Examiner* — Guy J Lamarre
(74) *Attorney, Agent, or Firm* — ERICSSON CANADA INC.

(57) ABSTRACT

A method in a sending node of a communications network includes: encoding a transport block, TB, including data of at least one protocol data unit, PDU, to generate a code block group, CBG, comprising one or more code blocks; defining a CBG header indicative of a starting location of a first PDU within the CBG; and transmitting the CBG including the CBG header. A method in a receiving node includes: receiving one or more code block groups, CBGs, each CBG comprising a CBG header indicative of a start location of a first protocol data unit, PDU, within the CBG; attempting to decode each received CBG; responsive to failing to decode a first CBG, attempting to decode a second CBG, and responsive to successfully decoding the second CBG: identifying the start location of the first PDU in the second CBG; buffering data of the second CBG prior to the identified start location; and forwarding data of PDUs following the identified start location.

13 Claims, 9 Drawing Sheets

(56) References Cited

U.S. PATENT DOCUMENTS

| | | | |
|---|---|---|---|
| 2005/0063347 A1* | 3/2005 | Sarkkinen | H04L 69/22 |
| | | | 370/342 |
| 2010/0232356 A1 | 9/2010 | Maheshwari et al. | |
| 2014/0233483 A1 | 8/2014 | You et al. | |
| 2022/0368494 A1* | 11/2022 | Low | H04L 1/0057 |

OTHER PUBLICATIONS

3GPP TS 38.212 NR, "Multiplexing and channel coding" (V15.3.0, Release 15), Sep. 2018.

3GPP TS 38.213, "Physical layer procedures for control", V15.2.0 (Jun. 2018).

3GPP TS 38.214, "Physical layer procedures for data", V15.2.0 (Jun. 2018).

3GPP TSG-RAN WG2 #97bis, Tdoc R2-1702738, "MAC PDU Design", Spokane, USA, Apr. 3-7, 2017, pp. 1-3.

* cited by examiner

(12) United States Patent

CODE BLOCK HEADER FOR FAST RLC PDU DELIVERIES IN 5G NR

This application is a 35 U.S.C. § 371 national phase filing of International Application No. PCT/IB2019/051336, filed Feb. 19, 2019, the content of which is incorporated herein by reference in its entirety.

TECHNICAL FIELD

The present disclosure relates to access network management, and in particular to transmitting Protocol Data Units (PDUs) in a radio access network.

BACKGROUND

Automatic Repeat Request (ARQ) techniques (such as Hybrid ARQ, HARQ) are used to provide reliable transmission of data through a wireless link between a pair of wireless nodes. ARQ may be used for either one or both of Downlink (DL) transmission from a radio access node, for example, to a remote wireless device, and Uplink (UL) transmission from the wireless device to the radio access node. It is common to refer to ARQ techniques as being implemented between a sending node and a receiving node, it being understood that the identity of the sending and receiving nodes will depend on the context (DL or UL) of the discussion.

As maybe be seen in FIG. 1A, in the ARQ technique, a stream of higher layer Protocol Data Units (PDUs) 100, such as Media Access Control (MAC) or Radio Link Control (RLC) PDUs to be transmitted from the sending node is partitioned into transport blocks (TBs) 102. Normally, a TB 102 will include at least one (and frequently more) MAC/RLC PDUs 100, which may have a variable length and an arbitrary alignment with the boundaries of the TB 102. Each TB 102 is passed to the PHY layer for encoding and transmission. Within the PHY layer, each TB 102 is segmented into a set of code blocks (CBs) 104 each of which is independently encoded with its own cyclic redundancy check (CRC) value. The encoded CBs 104 are then transmitted to the receiving node.

In the receiving node, each of the CBs of a received TB are independently decoded and verified using their respective CRC values. In conventional Long Term Evolution (LTE) networks, if all of the CBs within the received TB are successfully decoded, then the receiving node sends a positive acknowledgment (ACK) message back to the sending node. On the other hand, if any of the CBs 104 fail in decoding, the receiving node sends a negative acknowledgment (NACK) message to the sending node, which then retransmits all of the CBs 104 of the TB 102.

In 5G NR, to provide larger throughput, the low density parity check (LDPC) coding scheme has been introduced in the physical downlink shared channel (PDSCH) and physical uplink shared channel (PUSCH), which not only increases the size of each CB (e.g. to a maximum of 8448 bits), but also supports hundreds of CBs 104 in each TB 102. In this way, the conventional TB-based ARQ mechanisms have become unacceptable due to their low efficiency. To resolve the issue, 5G NR technical standards (such as 3GPP TS 38.212 NR Multiplexing and channel coding (V15.3.0, Release 15), September 2018; 3GPP TS 38.213 NR Physical layer procedures for control (V15.2.0, Release 15), June 2018; and 3GPP TS 38.214 NR Physical layer procedures for data (V15.2.0, Release 15), June 2018) introduced a new code block group (CBG) based ARQ mechanism in which the receiving unit sends ACK/NACK message feedback for each CBG instead of a whole TB.

As may be seen in FIG. 1B, CBG-based ARQ involves a further step in the sending node PHY layer of grouping CBs 104 into CBGs 106 prior to transmission. Each CBG 106 may include one or more CBs 104. In the illustrated example, each CBG 106 includes three CBs 104, which may be indicated to the receiving node in downlink control information (DCI), for example. The use of CBG-based ARQ allows the sending node to decode and verify each CB 104 in a conventional manner, but it only sends ACK/NACK feedback for each CBG 106. This means that when a CB 104 fails to decode, the sending node only needs to retransmit the corresponding NACKed CBG 106 instead of the whole TB 102, which greatly improves the ARQ efficiency.

CBG based DL transmission with single/multiple-bit HARQ-ACK feedback is supported in 5G NR, which has the following characteristics:

Only allow CBG based (re)-transmission for the same TB of an ARQ process;

A single CBG can include all CBs of a TB regardless of the size of the TB. In such case, the receiving node reports a single ACK/NACK bit for the TB; and CBG granularity is configurable by using RRC signaling.

An advantage of CBG based retransmission is that it allows ACK/NACK feedback and possible retransmission to be done on a finer granularity than a transport block. Feedback and retransmission can be based on a code block group level, so retransmissions do not have to be based on the whole TB.

A problem with the current CBG-based ARQ solution is that MAC/RLC PDUs are generally not aligned with the boundaries of the CBs and CBGs. This means that when a CB/CBG fails to decode, all subsequent CBs or CBGs must be buffered until the failed CB/CBG is retransmitted and successfully received, even if they have been correctly decoded. While the resulting delay in forwarding received MAC/RLC PDUs is less than if the entire TB had to be retransmitted, it still means that correctly received MAC/RLC PDUs are delayed while a failed CB/CBG is retransmitted and decoded. Such delay is undesirable. In addition, an undesirably large RLC buffer is needed to store correctly received MAC/RLC PDUs while a failed CB/CBG is retransmitted and decoded.

Techniques enabling efficient handling of MAC/RLC PDUs in a CBG-based ARQ technique remain highly desirable.

SUMMARY

An object of the present invention is to provide techniques that overcome at least some of the above-noted limitations of the prior art.

Accordingly, an aspect of the present invention provides a method in a sending node of a communications network. The method includes: encoding a transport block, TB, including data of at least one protocol data unit, PDU, to generate a code block group, CBG; defining a CBG header indicative of a starting location of a first PDU within the CBG; and transmitting the CBG including the CBG header to a receiving node of the communications network.

Another aspect of the present invention provides a method in a receiving node of a communications network. The method includes: receiving one or more code block groups, CBGs, from a sending node of the communications network, each CBG comprising a CBG header indicative of a start location of a respective first protocol data unit, PDU, within the CBG; attempting to decode each received CBG; responsive to failing to decode a first CBG, attempting to decode a second CBG, and responsive to successfully decoding the second CBG: identifying the start location of the respective first PDU in the second CBG, using the CBG header; buffering data of the second CBG prior to the identified start location; and forwarding data of PDUs following the identified start location.

Further aspects of the present invention provide a node in a communication network. The node includes at least one processor and a memory storing software instructions for controlling the at least one process to execute a process including the above-noted method steps, all as defined in the appended claims.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

Figure 1A:
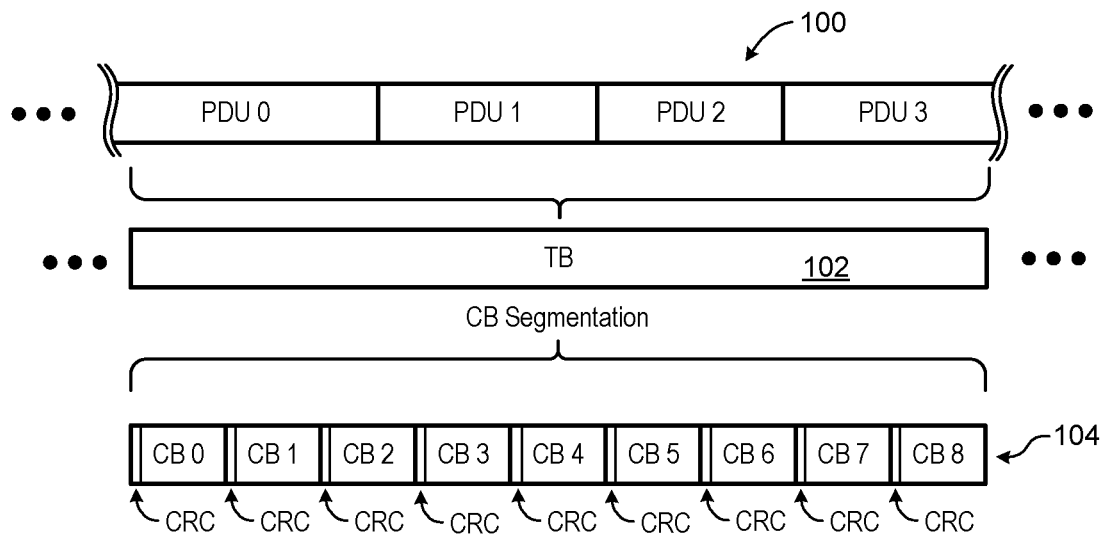
FIGS. 1A and 1B schematically illustrate ARQ transmission techniques known in the art.
Figure 1B:
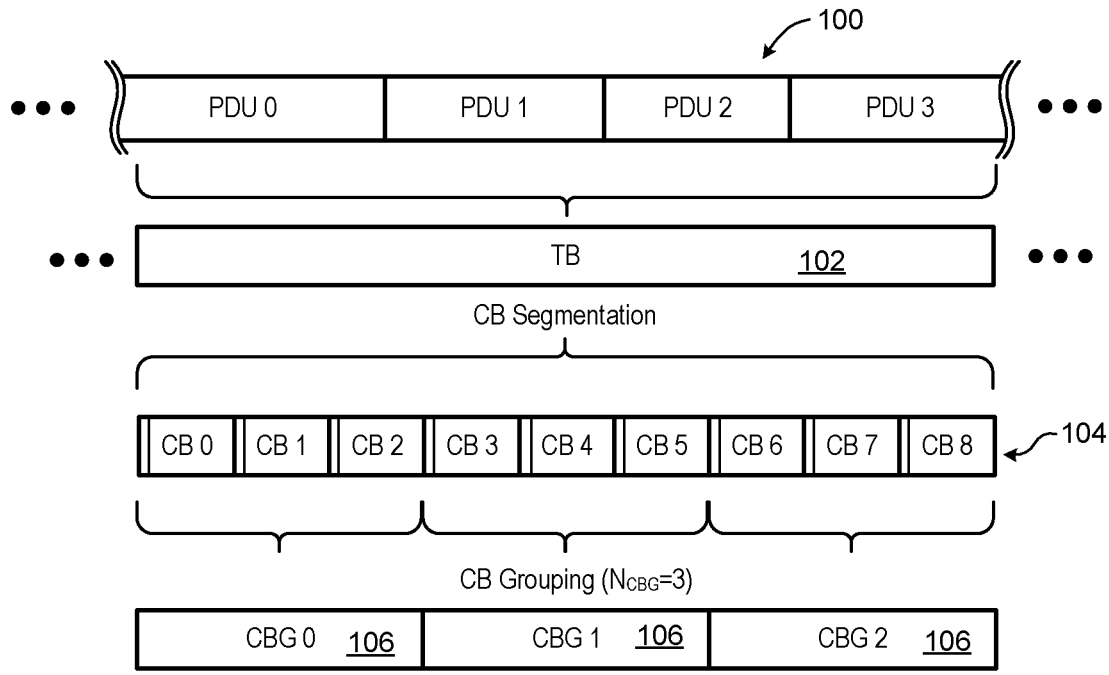

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3GPP Third Generation Partnership Project
5G Fifth Generation
AAS Antenna Array System
AoA Angle of Arrival
AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various standards (such as 3GPP TS 38.211 V15.1.0 (2018-09) and 3GPP TS 38.214 V15.1.0 (2018-09), for example) should be understood as referring to the most recent version of such standards at the time the present application was filed, and may also refer to any applicable successors of such standards.

Note that the description herein focuses on a 3GPP cellular communications system and, as such, 3GPP terminology or terminology similar to 3GPP terminology is oftentimes used. However, the concepts disclosed herein are not limited to a 3GPP system.

Figure 2:
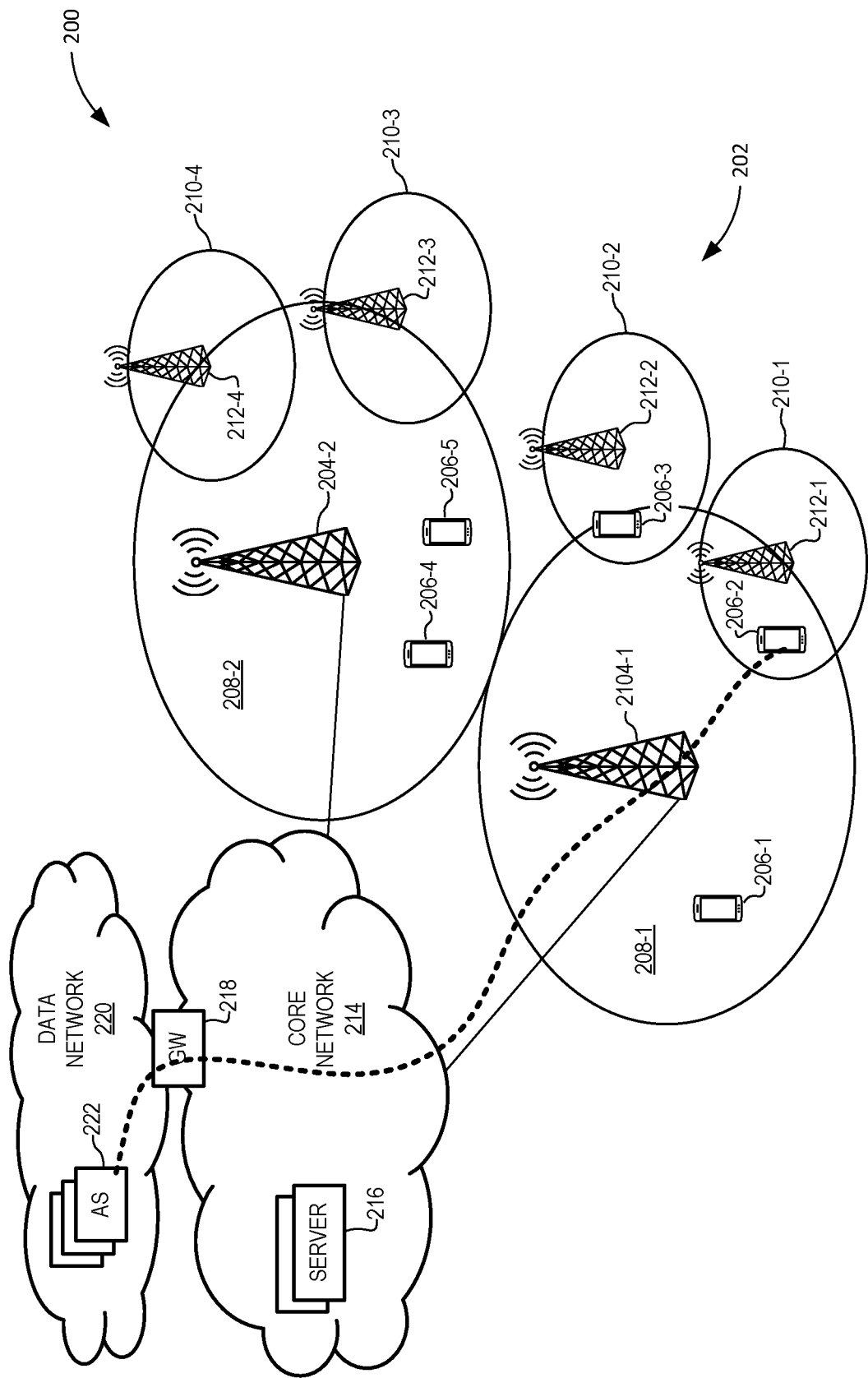
FIG. 2 is a block diagram schematically illustrating a representative network in which embodiments of the present invention may be deployed.

FIG. 2 illustrates one example of a cellular communications network 200 in which embodiments of the present disclosure may be implemented. In the embodiments described herein, the cellular communications network 200 is a Public Land Mobile Network (PLMN) conforming to one or more of the LTE, 3G, 4G and 5G NR standards, or their successors. In the illustrated example, the cellular communications network 200 includes a (Radio) Access Network (RAN) 202 comprising base stations 204-1 and 204-2 controlling radio communications with wireless devices 206-1, 206-2, 206-3, 206-4, 206-5 within corresponding macro cells 208-1 and 208-2. Each macro cell 208 may be defined by any suitable combination of geography, frequency, Radio Access Technology (RAT) and modulation scheme.

Base stations 204 can be any type of network access device capable of establishing radio connection(s) with one or more wireless devices 206 within a respective coverage area of the base station 204 or low power node 212, and further configured to forward subscriber traffic between the core network 214 and the one or more wireless devices 206. An important feature of a base station 204 is that it is configured with both a radio interface configured to send and receive radio signals to and from a wireless device 206, and a network interface configured to exchange electronic and/or optical signals with the core network 214. Examples of base stations 204 and low power nodes 212 include: Evolved Node B (eNB) systems (known, for example, in the 3GPP standards): WiFi access points (known, for example from IEEE 802.11 standards) or the like. In some contexts, a base station 2104 may be referred to as an access point (AP) regardless of the Radio Access Technology (RAT) that it supports.

The illustrated RAN 202 also includes small cells 210-1 through 210-4, within which radio communication can be controlled by corresponding low power nodes 212-1 through 212-4. As with the macro cells 208, each small cell may be defined by any suitable combination of geography, frequency, Radio Access Technology (RAT) and modulation scheme. As with the base stations 204, a low power node 212 can be any type of network access device capable of establishing radio connection(s) with one or more wireless devices 206 within a respective coverage area of the low power node 212, and further configured to forward subscriber traffic between the core network 214 and the one or more wireless devices 206. An important feature of a low power node 212 is that it is configured with both a radio interface configured to send and receive radio signals to and from a wireless device 106, and a network interface configured to exchange electronic and/or optical signals with the core network 214. In some embodiments, a low power node 212 may be connected to the core network 214 by a direct connection, such as an optical cable. In other embodiments, a low power node 112 may be connected to the core network 214 by an indirect connection, such as via a radio or optical fiber link to a base station 204. Examples of low power nodes 212 include: Remote Radio Heads (RRHs) connected to a base station or a network router (not shown): WiFi access points or the like. In some contexts, a low power node 212 may be referred to as an access point (AP) regardless of the specific Radio Access Technology (RAT) that it supports.

Notably, while not illustrated, a particular small cell 210 may alternatively be controlled by a base station 204, for example using a beam-forming technique. In such cases, the particular small cell 210 will not be associated with a respective low power node 212 per se. Rather, the particular small cell 210 will be associated with a respective set of parameters implemented in the base station 204. In this disclosure, the term "cell" is used to refer to a defined combination of parameters (such as geography, frequency, Radio Access Technology, RAT, modulation scheme, identifiers and the like) that can be used by a wireless device 106 to access communication services of the network 200. The term "cell" does not imply any particular parameter values, or any particular physical configuration of devices needed to enable a wireless device 206 to access those communication services.

Wireless devices 206 can be any type of device capable of sending and receiving radio signals to and from a base station 204 and/or low power node 212. Examples of wireless device 206 include cellular phones, Personal Data Assistants (PDAs), mobile computers, Internet of Things (IoT) devices, autonomous vehicle controllers, and the like. In some contexts, a wireless device 206 may be referred to as a User Equipment (UE) or a mobile device.

In some embodiments, the macro cells 208-1 and 208-2 may overlap each other, and may also overlap one or more small cells 210. For example, a particular macro cell 108-1 may be one macro cell 208 among a plurality of macro cells covering a common geographical region and having a common RAT and modulation scheme, but using respective different frequencies and/or AP identifiers. In such cases, a wireless device 206 located within a region covered by two or more overlapping cells 208, 212 may send and receive radio signals to and from each of the corresponding base stations 204 and/or low power nodes 212.

In the illustrated example, the RAN 202 is connected to a Core Network (CN) 214, which may also be referred to as Evolved Core Network (ECN) or Evolved Packet Core (EPC). The CN 214 includes (or, equivalently, is connected to) one or more servers 216 configured to provide networking services such as, for example, Network Functions (NFs) described in 3GPP TS 23.501 V15.2.0 (2018-06) "System Architecture for the 5G System" and its successors. The CN 214 also includes one or more gateway (GW) nodes 118 configured to connect the CN 214 to a packet data network (DN) 220 such as, for example, the internet. A gateway node 218 may be referred to as a packet gateway (PGW) and/or a serving gateway (SGW). The DN 220 may provide communications services to support end-to-end communications between wireless devices 206 and one or more application servers (ASs) 222 configured to exchange data packet flows with the wireless devices 206 via the CN 214 and RAN 202. In some contexts, an application server (AS) 222 may also be referred to as a host server.

In some contexts, an end-to-end signal path between an AS 222 and one or more wireless devices 206 may be referred to as an Over-The-Top (OTT) connection. Similarly, a communication service that employs signal transmission between an AS 222 and one or more wireless devices 206 may be referred to as an OTT service.

It should be appreciated that the separation between the CN 214 and the DN 220 can be purely logical, in order to simplify understanding of their respective roles. In particular, the CN 214 is primarily focused on providing wireless device access services and supporting wireless device mobility. On the other hand, the DN 220 is primarily focused on providing end-to-end communications, particularly across network domains. However, it will be appreciated that both the CN 214 and the DN 220 can be implemented on common physical network infrastructure, if desired.

Figure 3A:
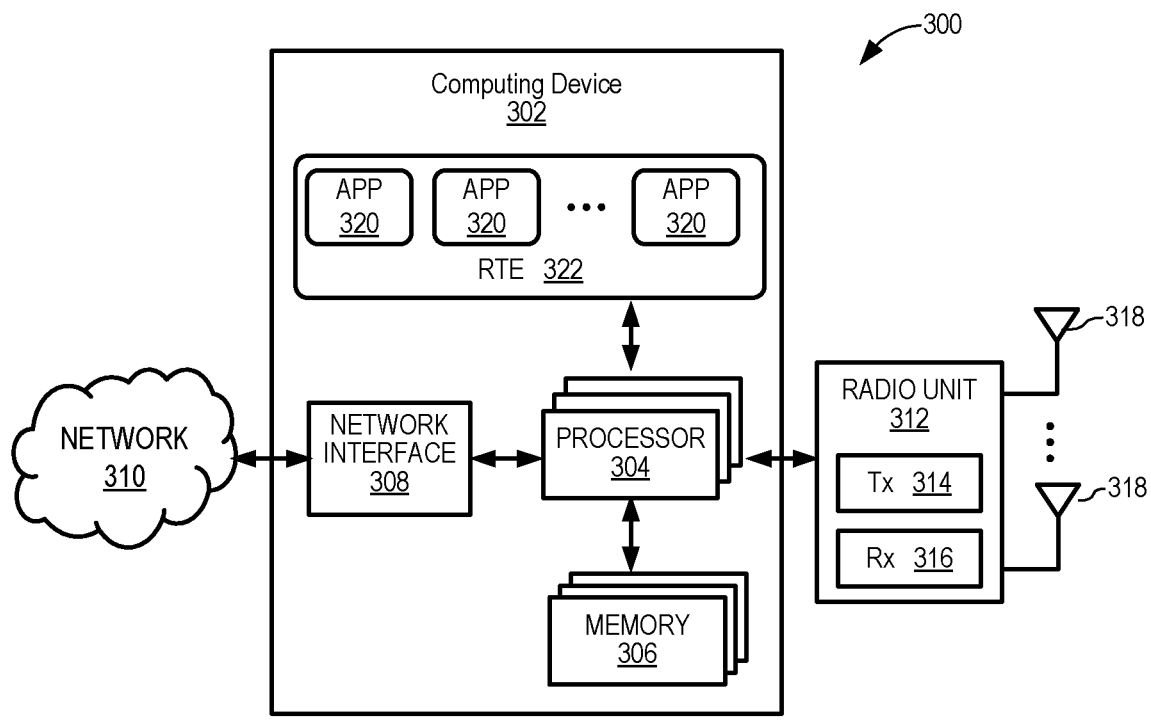
FIGS. 3A and 3B are block diagrams schematically illustrating examples of a computing device usable in embodiments of the present invention.
Figure 3B:
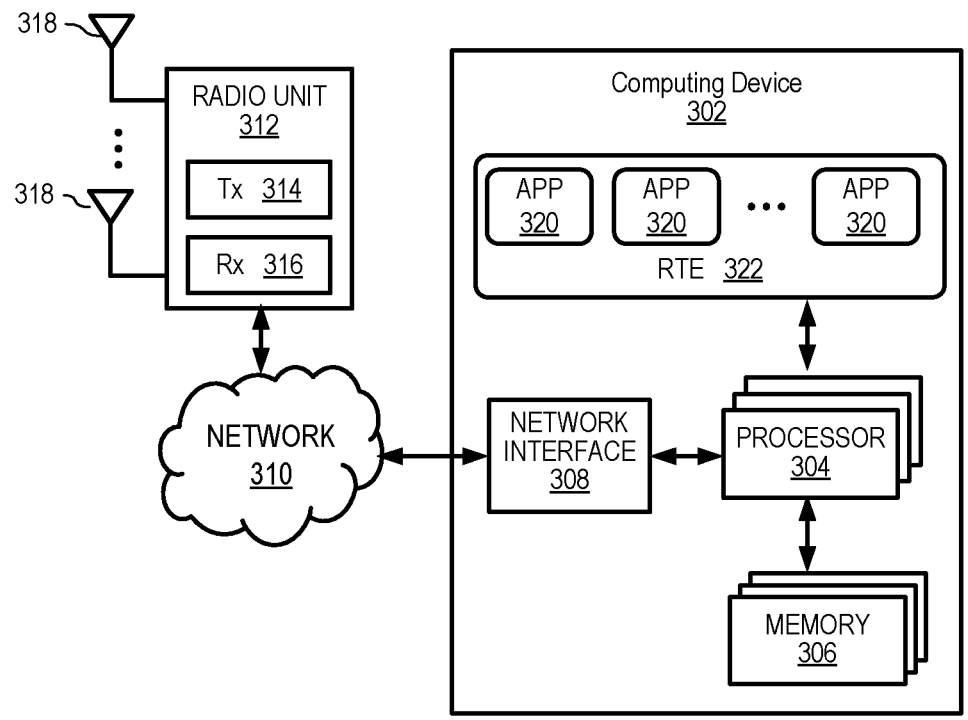

FIGS. 3A and 3B is a block diagram schematically illustrating a communications system 300 including a computing device 302 usable in embodiments of the present invention. In various embodiments, any or all of the base stations 104 or 112, wireless devices 106, core network servers 116 or gateways 118 and data network servers 122 may be implemented using systems and principles in accordance with the computing device 302. It may also be appreciated that any or all of the elements of the network 100 may be virtualized using techniques known in the art or developed in the future, in which case the functions of any or all the base stations 104 or 112, core network servers 116 or gateways 118, and/or any or all of the network functions 206-226 may be implemented by suitable software executing within a computing device 302 or within a data center (non shown) composed of multiple computing devices 302.

In the example of FIG. 3A, the communications system 300 generally includes computing device 302 connected to one or more networks 310 and one or more radio units 312. The computing device 302 includes one or more processors 304, a memory 306, one or more network interfaces 308. The processors 304 may be provided as any suitable combination of Central Processing Units (CPUs), Application Specific Integrated Circuits (ASICs), Field Programmable Gate Arrays (FPGAs), or the like. Similarly, the memory 306 may be provided as any suitable combination of Random Access Memory (RAM), Read Only Memory (ROM) and mass storage technologies such as magnetic or optical disc storage or the like. The network interfaces 308 enable signaling between the computing device 300 and the networks 310, such as the Core Network 114, the data network 120, or a private domain network such as a data center (not shown).

Each radio unit 312 typically includes at least one transmitter (Tx) 314 and at least one receiver (Rx) 316 coupled to one or more antennas 318. In the example of FIG. 3A, the radio unit(s) 312 is(are) shown as being external to the computing device 302 and connected to the computing device 302 via a suitable physical connection (such as a copper cable or an optical cable). In the example of FIG. 3B, the radio unit(s) 312 is(are) shown as being connected to computing device 302 via a network 310 and a network interface 308. In still other embodiments, the radio unit(s) 312 and optionally also the antenna(s) 318 may be integrated together with the computing device 302.

The one or more processors 304 operate to provide functions of the computing device 302. Typically, these function(s) are implemented as software applications (APPs) 320 or modules that are stored in the memory 306, for example, and executed by the one or more processors 304. In some embodiments, one or more software applications or modules 320 may execute within a secure run-time environment (RTE) 322 maintained by an operating system (not shown) of the computing device 302.

It may be appreciated that specific embodiments may exclude one or more of the elements illustrated in FIGS. 3A and 3B. For example, a computing device 302 configured to implement a wireless device 106 may incorporate one or more processors 304, a memory 306, and one or more radio units 312, but may exclude a network interface 308. Conversely, a computing device 302 configured to implement a server 116 or 122 may include one or more processors 304, a memory 306, and one or more network interfaces 308, but may exclude radio units 312. A computing device 302 configured to implement a base station 104 or 112, on the other hand, will normally include one or more processors 304, a memory 306, and both radio units 312 and network interfaces 308.

Figure 4:
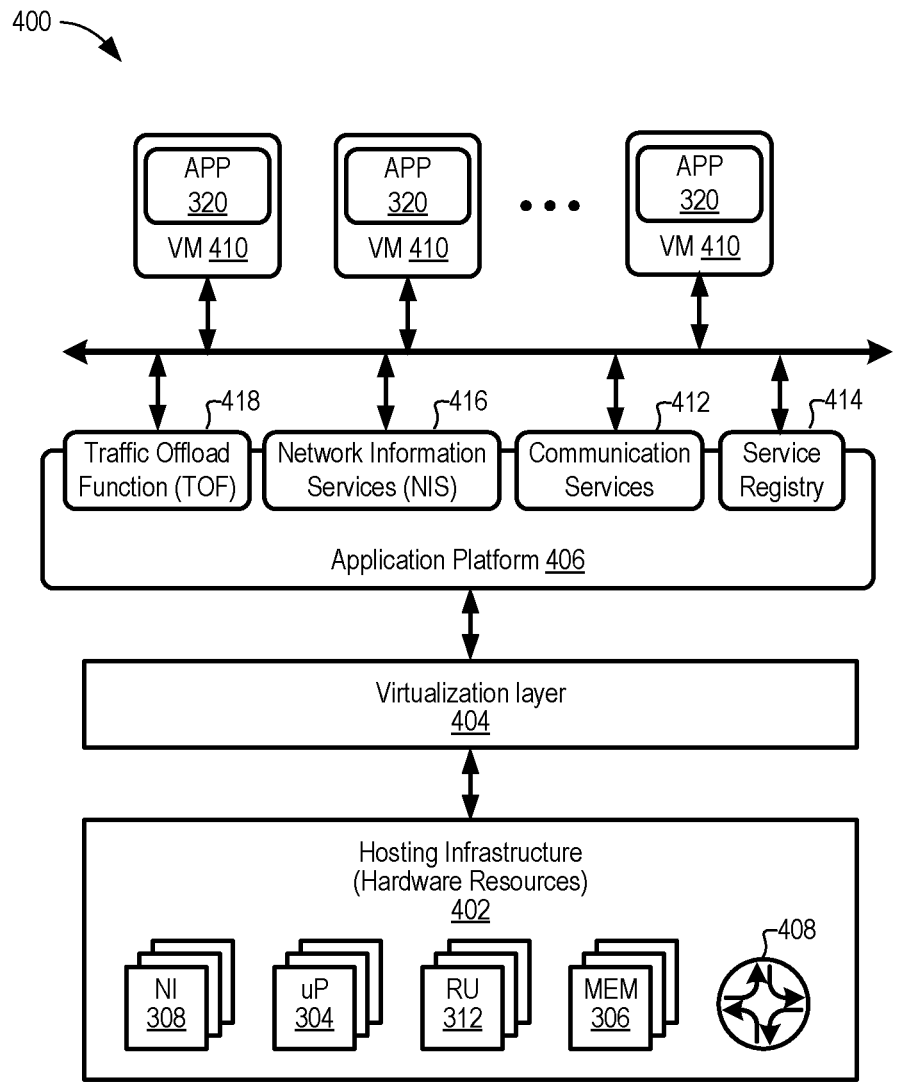
FIG. 4 is a block diagram schematically illustrating an architecture of a representative network element virtualization usable in embodiments of the present invention.

FIG. 4 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 300 described above with reference to FIG. 3) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As maybe seen in FIG. 4, the illustrated architecture 400 generally comprises hosting infrastructure 402, a virtualization layer 404 and an Application Platform Services layer 406. The hosting infrastructure 402 comprises physical hardware resources provided by the infrastructure on which the architecture 400 is being implemented. These physical hardware resources may include any or all of the processors 304, memory 306, network interfaces 308 and radio units 312 described above with reference to FIG. 3, and may also include traffic forwarding and routing hardware 408. The virtualization layer 404 presents an abstraction of the hardware resources 402 to the Application Platform Services layer 406. The specific details of this abstraction will depend on the requirements of the applications 320 being hosted by the Application Platform Services layer 406. Thus, for example, an APP 320 that provides traffic forwarding functions (for example as part of a User Plane Function, UPF) may be presented with an abstraction of the hardware resources 406 (e.g. processor(s) 304, memory 306 and traffic forwarding hardware 408) that simplifies the implementation of traffic forwarding policies. Similarly, an application that provides data storage functions (for example implementing a Unified Data Management, UDM, and/or a Unified Data Repository, UDR) may be presented with an abstraction of the hardware resources 406 (e.g. processor(s)

304 and memory 306) that facilitates the storage and retrieval of data (for example using Lightweight Directory Access Protocol—LDAP).

The application platform 406 provides the capabilities for hosting applications. In some embodiments, the application platform 406 supports a flexible and efficient multi-tenancy run-time and hosting environment for applications 320 by providing Infrastructure as a Service (IaaS) facilities. In operation, the application platform 406 may provide a security and resource "sandbox" for each application 320 being hosted by the platform 406. Each "sandbox" may be implemented as a Virtual Machine (VM) image 410 that may include an appropriate operating system and controlled access to (virtualized) hardware resources 402. The application platform 406 may also provide a set of middleware application services and infrastructure services to the applications 320 hosted on the application platform 406, as will be described in greater detail below.

Applications 320 from vendors, service providers, and third-parties may be deployed and executed within a respective Virtual Machine 410. For example, a Policy Control Function (PCF) may be implemented by means of one or more applications 320 hosted on the application platform 406 as described above. Communication between applications 320 and services of the application platform 406 may conveniently be designed according to the principles of Service-Oriented Architecture (SOA) known in the art.

Communication services 412 may allow applications 320 to communicate with the application platform 406 (through pre-defined Application Programming Interfaces (APIs) for example) and with each other (for example through a service-specific API).

A Service registry 414 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Network Information Services (NIS) 416 may provide applications 320 with low-level network information pertaining to a network service instance or one or more PDU sessions, for example. For example, the information provided by NIS 416 may be used by an application 320 to calculate and present relevant data (such as: cell-ID, location of the subscriber, cell load and throughput guidance) to a Service Management Function (SMF), an Access and Mobility Function (AMF) and the PCF, any or all of which may themselves to implemented by applications 320 executing in respective VMs 410.

A Traffic Off-Load Function (TOF) service 418 may prioritize traffic, and route selected, policy-based, data streams to and from applications 320.

Figure 5:
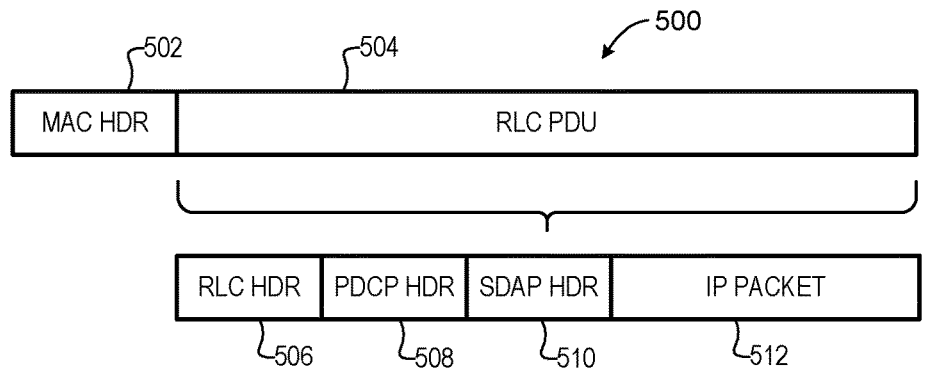
FIG. 5 is a block diagram schematically illustrating a structure of a MAC PDU usable in embodiments of the present invention

FIG. 5 shows an example of a MAC PDU structure in 5G. As may be seen in FIG. 5, the MAC PDU 500 may be formed by prepending a MAC Header 502 to an RLC PDU 504. In such a case, the MAC header normally includes an indication of the length of the RLC PDU 504. Alternatively, a MAC PDU 500 may be constructed using any other suitable payload (in place of the RLC PDU 504). For example, the MAC PDU 500 may be a MAC Control Element (MCE) packet. In any such embodiments, MAC Header 502 will normally include an indication of the packet length, which enables a receiver to separate MAC PDUs recovered from an incoming stream of CBs or CBGs.

In the embodiment illustrated in FIG. 5, the RLC PDU 504 includes an RLC header 506, a Packet Data Convergence Protocol (PDCP) header 508, a Service Data Adaptation Protocol (SDAP) header 510, and an Internet Protocol (IP) packet 512.

One problem with current ARQ techniques is that when a CBG is missing or incorrectly decoded, all subsequent CBGs have to be buffered even if they are all correctly decoded, until the missing CBG is successfully received. This not only introduces a large delay in delivering decoded PDUs to the higher layer(s), but also increases the required size of the ARQ buffers.

Figure 6:
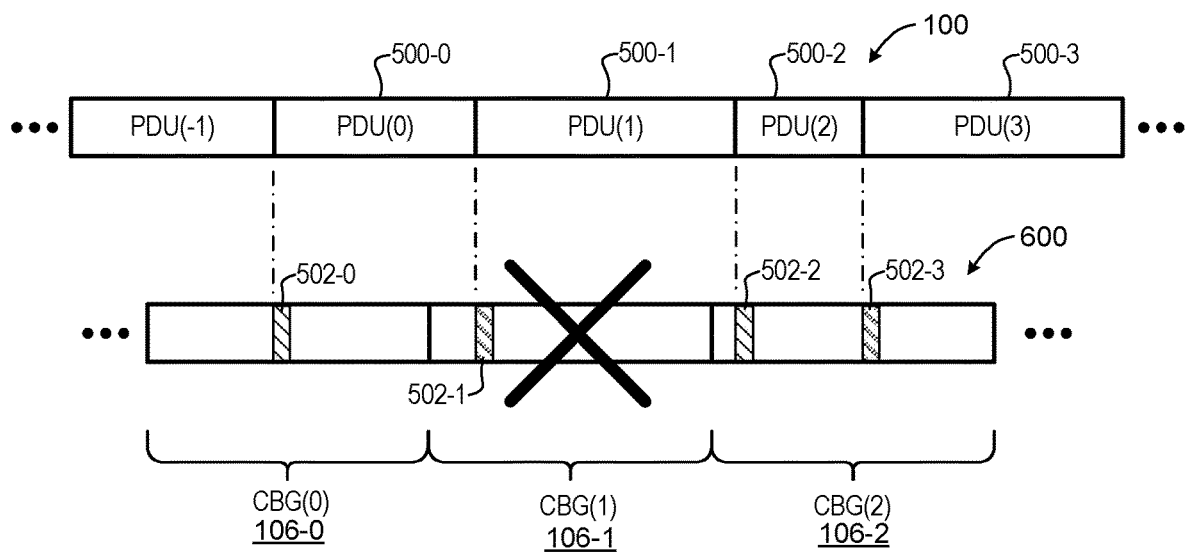
FIG. 6 illustrates an effect of failure to receive a code block group in a conventional ARQ transmission technique.

FIG. 6 Illustrates this problem in greater detail. As may be seen in FIG. 6, a sequence 600 of successively transmitted CBGs 106 is shown. Each CBG 106 may include one or more CBs 104 (not shown), and may contain encoded data of part of a MAC PDU 500 or of multiple MAC PDUs 500. The alignment between each MAC header 502 and the boundaries of any given CBG 106 is arbitrary, and changes depending on the variable lengths of the MAC PDUs 500. Consequently, it is not possible to use the boundaries of a CBG 106 to locate the start of a MAC PDU 500. Rather, the PDU length indication within the MAC header 502 is used to locate the start of the next MAC PDU (which may be located in the same CBG or in a later CBG in the sequence 600). However, if a CBG 106 is missing or fails to decode, any MAC header(s) 502 contained within that CBG 106 will also be missing, so that it is not possible to identify the start of the next MAC PDU 500 encoded in the CBG sequence 600.

FIG. 6 illustrates and example in which CBG(1) 106-1 is missing, e.g. due to a failure to correctly decode. In this example, CBG(1) 106-1 contains the trailing part of PDU(0) 500-0, and the leading portion (including the MAC header 502-1) of PDU(1) 500-1. Since the MAC header 502-1 of PDU(1) is missing, there is no means of locating the starting point of PDU(2) 500-2 in CBG(2) 106-2, even if CBG(2) is properly decoded. As a result, the entire content of CBG(2) (and any subsequently received CBGs) must be buffered until CBG(1) has been successfully received.

Figure 7:
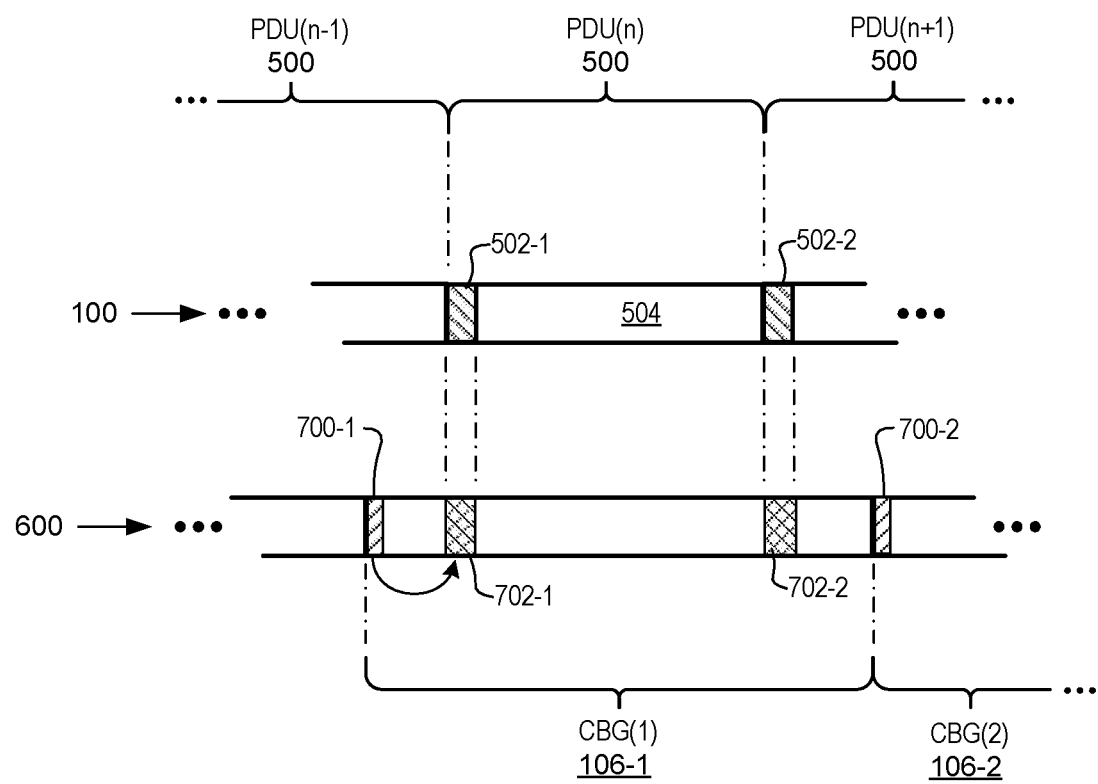
FIG. 7 schematically illustrates a code block group in accordance with a representative embodiment of the present invention.
Figure 8:
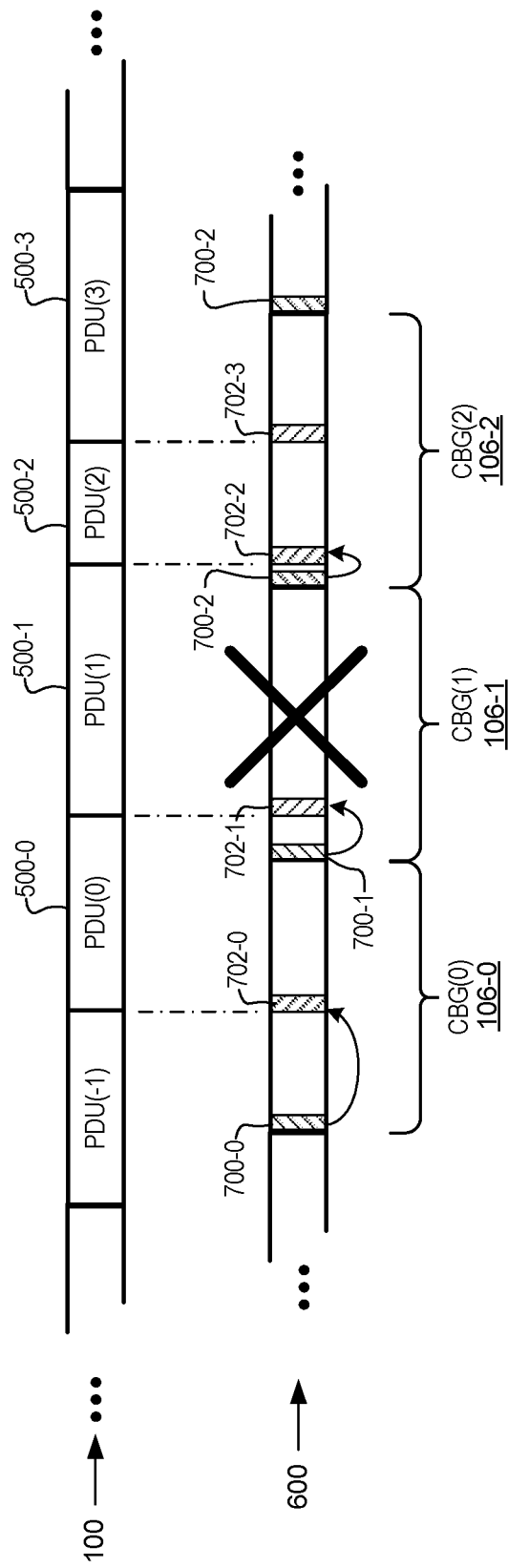
FIG. 8 illustrates an effect of failure to receive a code block group in an ARQ transmission technique in accordance with a representative embodiment of the present invention.

Systems and methods are disclosed herein that reduce the time delay of delivering decoded PDUs to higher layers as well as to reduce the ARQ data buffer size. Referring to FIG. 7, in accordance with embodiments of the present disclosure, this is accomplished by providing a respective CBG header 700 in each CBG 106. The CBG header 700 may be located at any desired position within the CBG. In the illustrated embodiments, the CBG header 700 is located at the beginning of the CBG 106. For example, the CBG header 700 may occupy the first one or more bytes of the CBG 106. However, other locations within the CBG 106 may be used, if desired.

The CBG header 700 includes an indication of the starting location of the first PDU within that CBG 106. In some embodiments, the indication of the starting location may include a pointer to the starting location. In the example of FIG. 7, the starting location of a PDU within a CBG is the location of a set of bytes 702 corresponding to the MAC header 502 of the MAC PDU 500 encoded within the CBG 106.

For clarity of understanding the present disclosure, the "first PDU within the CBG" should be understood to refer to the PDU having a starting location nearest to the leading boundary of the CBG. For example, in FIG. 7, CBG(1) contains the trailing portion of PDU(n−1), the entirety of PDU(n) and a leading portion of PDU(n+1). In this case, the PDU having a starting location nearest to the leading boundary of CBG(1) corresponds to PDU(n), and so the CBG header 700-1 of CBG(1) would include an indication of the starting location of PDU(n) within CBG(1). As noted above, this starting location may be taken as the location of encoded bytes 702 corresponding with the MAC header 502 of PDU(n).

In some embodiments, the starting location of each PDU is indicated by a known header, such as, for example, a MAC header 502. Other headers may also be used either in addition to or instead of the MAC header 502. For example, any of the RLC header 506, PDCP header 508, or the SDAP header 510 may be used (alone or in combination) to identify the start of a PDU. Other techniques for marking the starting location may also be used, if desired. For example, a predetermined binary symbol sequence could be used, although this approach may undesirably increase overhead.

For simplicity of description, example embodiments are illustrated in which the PDUs encoded within the stream of CBGs are MAC PDUs 500. However, it will be appreciated that the present technique is not restricted to MAC PDUs. For example, the PDUs encoded within the stream of CBGs may be MAC PDUs, RLC PDUs (i.e. without a MAC header 502), MAC Control Element, MCEs, or any other suitable protocol data units.

For simplicity of description example embodiments are illustrated in which the PDUs encoded within a stream of code block groups (CBGs). A code block group may encompass one or more code blocks (CBs). For the reduced case in which each CBG includes only one CB, the CBG header 700 becomes a code block header (CBH), which indicates the starting location of the first PDU within that CB. If desired per-CB code block headers may be used in CBGs including more than one CB. This solution enables detection of the starting location of the first PDU with a finer granularity than a whole CBG, but at a cost of greater overhead.

An advantage of this arrangement is that, as long as a CBG is correctly decoded, any decoded PDUs that start within that CBG can be immediately delivered to higher layers even if one or more previous CBGs have been missed. FIG. 7 illustrates and example in which (as in FIG. 6 described above) CBG(1) 106-1 is missing, e.g. due to a failure to correctly decode. In this example, CBG(1) 106-1 contains the trailing part of PDU(0) 500-0, and the leading portion (including the MAC header 502-1) of PDU(1) 500-1. However, unlike in the example of FIG. 6, the CBG header 700-2 of CBG(2) 106-2 contains an indication of the starting point of the first PDU in that code block group, which in this example is PDU(2). Accordingly, upon successful decoding of CBG(2), the starting location of PDU(2) 502-2 can be located so the PDU(2) and following PDUs can be forwarded, even before CBG(1) has been successfully received. This means that the ARQ buffer(s) only need to store data directly affected by the failure of CBG(1), which in the example of FIG. 7 relates to PDU(0) and PDU(1). Because the content of CBG(2) and any subsequently received CBGs do not need to be buffered until CBG(1) has been successfully received, the required size of the ARQ buffer is reduced as compared to conventional ARQ techniques.

The methods disclosed herein can be applied to any suitable communications technology, including LTE and 5G NR.

Figure 9:
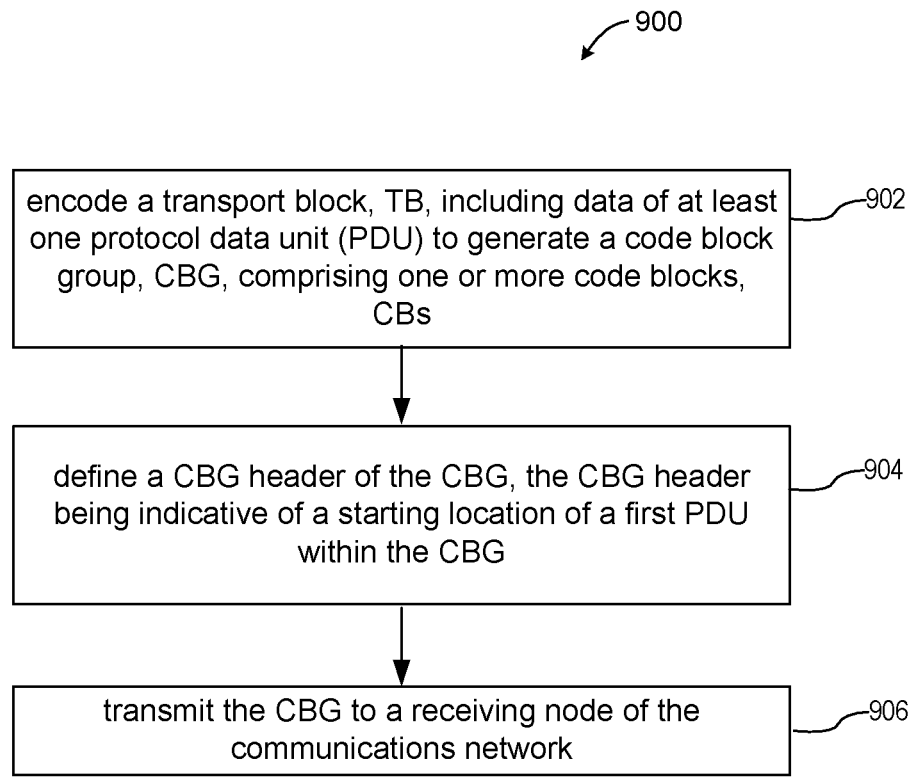
FIG. 9 is a flow chart illustrating a process in a sending node of a communication network, in accordance with a representative embodiment of the present invention.

FIG. 9 is a flowchart illustrating a method 900 that may be implemented in a sending node in accordance with embodiments of the present invention. The method of FIG. 9 includes:

Encoding 902 a transport block, TB, including data of at least one protocol data unit (PDU) to generate a code block group, CBG, comprising one or more code blocks, CBs;

Defining 904 a CBG header of the CBG, the CBG header being indicative of a starting location of a first PDU within the CBG; and Transmitting 906 the CBG to a receiving node of the communications network.

Figure 10:
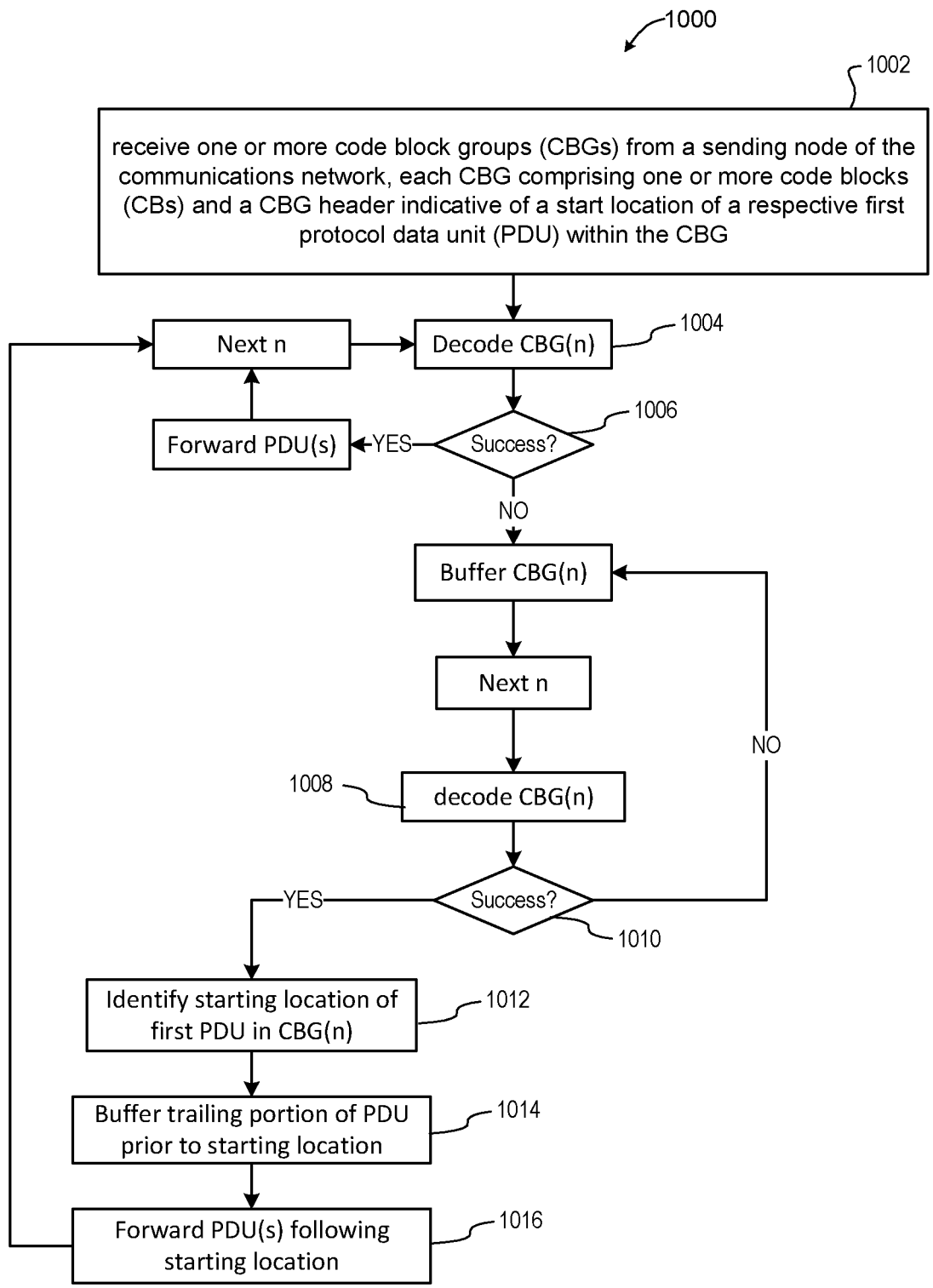
FIG. 10 is a flow chart illustrating a process in a receiving node of a communication network, in accordance with a representative embodiment of the present invention.

FIG. 10 is a flowchart illustrating a method 1000 that may be implemented in a receiving node in accordance with embodiments of the present invention. The method of FIG. 10 includes:

Receiving (at 1002) one or more code block groups (CBGs) from a sending node of the communications network, each CBG comprising one or more code blocks (CBs) and a CBG header indicative of a start location of a respective first protocol data unit (PDU) within the CBG;

Attempting to decode (at 1004) each received CBG;

Responsive to failing to decode a first CBG (at 1006), attempting to decode (at 1008) a second CBG, and responsive to successfully decoding (at 1010) the second CBG:

Identifying (at 1012) the start location of the respective first PDU in the second CBG, using the CBG header;

Buffering (at 1014) data of the second CBG prior to the identified start location; and Forwarding (at 1016) data of PDUs following the identified start location.

For simplicity, the flowchart of FIG. 10 illustrates the decoding and processing of received CBGs in sequence. However, it will be appreciated that the techniques of the present disclosure may equally be applied to embodiments in which two or more received CBGs are decoded and processed in parallel.

While processes in the figures may show a particular order of operations performed by certain embodiments of the present disclosure, it should be understood that such order is representative (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method in a sending node of a communications network, the method implemented in the sending node PHY layer and comprising:
    encoding a transport block, TB, including data of at least one protocol data unit (PDU) to generate a code block group, CBG comprising one or more Code Blocks, CBs, each CB being independently encoded with a respective cyclic redundancy check, CRC, value;
    defining a CBG header indicative of a starting location of a first PDU within the CBG; and
    transmitting the CBG including the CBG header to a receiving node of the communications network.

2. The method as claimed in claim 1, wherein the sending node is a wireless access node, and the receiving node is a wireless device in a coverage area of the wireless access node.

3. The method as claimed in claim 1, wherein the CBH is defined at a predetermined location within the CBG.

4. The method as claimed in claim 1, wherein defining the CBH comprises steps of:
    determining a location of a first header of a PDU within the CBG;
    defining the CBH including a pointer to the determined location.

5. The method as claimed in claim 4, wherein the first header is a Media Access Control, MAC, sub-header.

6. The method as claimed in claim 1, wherein the first PDU is either one of a Radio Link Control, RLC, PDU or a MAC Control Element, MCE.

7. A node in a communications network, the node comprising:
- at least one processor;
- a memory storing software instructions configured to control the at east one processor to execute a PHY layer process including steps of:
  - encoding a transport block, TB, including data of at least one protocol data unit, PDU, to generate a code block group, CBG, comprising one or more code blocks, CBs, each CB being independently encoded with a respective cyclic redundancy check, CRC, value;
  - defining a CBG header indicative of a starting location of a first PDU within the CBG; and
  - transmitting the CBG including the CBG header to a second node of the communications network.

8. The node as claimed in claim 7, wherein the node is a wireless access node, and the second node is a wireless device in a coverage area of the wireless access node.

9. A method in a receiving node of a communications network, the method implemented in the receiving node PHY layer and comprising;
- receiving, from a sending node of the communications network, one or more code block groups, CBGs, of a transport block, TB, including data of at least one protocol data unit, PDU, each CBG comprising:
  - one or more code blocks, CBs, each CB being independently encoded with a respective cyclic redundancy check, CRC, value; and
  - a CBG header indicative of a start location of a respective first protocol data unit, PDU, within the CBG;
- attempting to decode each received CBG;
- responsive to failing to decode a first CBG, attempting to decode a second CBG, and responsive to successfully decoding the second CBG:
  - identifying the start location of the respective first PDU in the second CBG, using the CBG header;
  - buffering data of the second CBG prior to the identified start location; and
  - forwarding data of PDUs following the identified start location.

10. The method as claimed in claim 9, wherein the sending node is a wireless access node, and the receiving node is a wireless device in a coverage area of the wireless access node.

11. The method as claimed in claim 9, wherein buffering data of the second CBG prior to the identified start location comprises buffering decoded data recovered from the second CBG between a start of the second CBG and the identified start location of the respective first PDU in the second CBG.

12. A node in a communications network, the node comprising:
- at least one processor;
- a memory storing software instructions configured to control the at east one processor to execute a PHY layer process including steps of:
  - receiving, from a sending node of the communications network, one or more code block groups, CBGs, of a transport block, TB, including data of at least one protocol data unit, PDU, each CBG comprising:
    - one or more code blocks, CBs, each CB being independently encoded with a respective cyclic redundancy check, CRC, value; and
    - a CBG header indicative of a start location of a respective first protocol data unit, PDU, within the CBG;
  - attempting to decode each received CBG;
  - responsive to failing to decode a first CBG, attempting to decode a second CBG, and responsive to successfully decoding the second CBG:
    - identifying the start location of the respective first PDU in the second CBG, using the CBG header;
    - buffering data of the second CBG prior to the identified start location; and
    - forwarding data of PDUs following the identified start location.

13. The method as claimed in claim 12, wherein the node is a wireless device, and the second node is a wireless access node serving the wireless device.

\* \* \* \* \*